United States Patent
Vincent et al.

(10) Patent No.: US 8,219,812 B2
(45) Date of Patent: Jul. 10, 2012

(54) METHODS AND A DEVICE FOR ASSOCIATING A FIRST DEVICE WITH A SECOND DEVICE

(75) Inventors: Christophe Vincent, Chevaigni (FR);
Olivier Courtay, Rennes (FR)

(73) Assignee: Thomson Licensing,
Boulogne-Billancourt (FR)

( * ) Notice: Subject to any disclaimer, the term of this patent is extended or adjusted under 35 U.S.C. 154(b) by 430 days.

(21) Appl. No.: 12/312,442

(22) PCT Filed: Oct. 11, 2007

(86) PCT No.: PCT/EP2007/060845
§ 371 (c)(1),
(2), (4) Date: May 11, 2009

(87) PCT Pub. No.: WO2008/061848
PCT Pub. Date: May 29, 2008

(65) Prior Publication Data
US 2010/0058452 A1 Mar. 4, 2010

(30) Foreign Application Priority Data
Nov. 21, 2006 (EP) .................................. 06301160

(51) Int. Cl.
*H04L 9/32* (2006.01)
*G06F 7/04* (2006.01)
(52) U.S. Cl. ............................ 713/169; 726/26; 713/183
(58) Field of Classification Search .................. 713/169
See application file for complete search history.

(56) References Cited

U.S. PATENT DOCUMENTS
6,539,479 B1 3/2003 Wu
2006/0293028 A1* 12/2006 Gadamsetty et al. ......... 455/411

OTHER PUBLICATIONS

"SRP-6: Improvements and Refinements to the Secure Remote Password Protocol"; Wu, Thomas; Arcot Systems; Oct. 29, 2002.*
T. Wu: "The Secure Remote Password Protocol", Proceedings Internet Society Symposium on Network and Distributed System Security, Mar. 1998, pp. 1-17, XP002249355.
T Wu, Stanford University: "the SRP Authentication and Key Exchange System" IETF Standard, Internet Engineering Task Force, Sep. 2000, XP015008728.
Jeong Ok Kwon et al: "One-Round Protocol for Two-Party Verifier-Based Password-Authenticated Key Exchange", Communications and Multimedia Security, Lecture Notes in Computer Science; vol. 4237, 2006, pp. 87-96, XP019047503.
Jeong Ok Kwon et al: Database Compendex Engineering Information Inc., New York, NY. Oct. 21, 2006, "One-Round protocol for two-party verifier-based password-authenticated key exchange" XP002442083 & Published in: Lect. Notes Comput, Sci: Lecture Notes in Computer Science; vol. 4237 LNCS, 2006, pp. 87-96, EP019047503.
Search Report Dated Jun. 2, 2008.

* cited by examiner

*Primary Examiner* — Taghi Arani
*Assistant Examiner* — Mohammad Rahman
(74) *Attorney, Agent, or Firm* — Tutunjian & Bitetto, P.C.

(57) ABSTRACT

A method and device for device association. A user enters login and password on a first device that searches for reachable devices. The first device asks the reachable devices if they know the login, preferably by sending a salted hash of the login. The devices that know the login respond positively and the first device lists the responding devices. The first device then successively performs Secure Remote Authentication (SRP) with each device on the list until an authentication succeeds or there are no further devices on the list. The SRP authentication makes sure that the first device knows the login and that the other device knows a password verifier without transmitting any knowledge that allows recuperation of this info by an eavesdropper. The authenticated devices then establish a secure channel over which a community secret key is transferred, and the first device also calculates and stores the password verifier.

6 Claims, 1 Drawing Sheet

METHODS AND A DEVICE FOR ASSOCIATING A FIRST DEVICE WITH A SECOND DEVICE

This application claims the benefit, under 35 U.S.C. §365 of International Application PCT/EP2007/060845, filed Oct. 11, 2007, which was published in accordance with PCT Article 21(2) on May 29, 2008 in English and which claims the benefit of European patent application No. 06301160.5, filed on Nov. 21, 2006.

FIELD OF THE INVENTION

The present invention relates generally to wireless networks, and in particular to the association of devices in such networks.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

An important security problem with computer networks is that humans are involved. Administrating such a network requires specific knowledge, which the average user rarely has. For this reason, a user faced with complicated user interfaces often opts for the lowest level of security, sometimes even removing it completely. It can thus clearly be appreciated that there is a need for an easy way to facilitate the task for the user as much as possible, while keeping security at an acceptable level, especially in wireless networks that by nature are easy to eavesdrop and use information transmitted in such a network for purposes it was not intended for, such as hacking.

Many existing solutions require the user to have access to both of the devices he or she wishes to associate. The user may for example instruct each device to associate only with the other device. For example, European patent application EP 1411674 A1 presents a solution where a central point, at the simple click of a button, restricts the coverage of the radio waves it transmits. Then the user activates a function on a device within the reduced coverage area to insert it into the network of the central point. A disadvantage with this solution is that it is rather vulnerable to various kinds of attacks, such as for example the well-known man-in-the-middle attack. The person skilled in the art will also appreciate that it is not always possible for the user to access both devices, such as if the central point is not physically attainable.

Other solutions require the user to know a secret of the device to be associated with, such as an identity of the device or a secret network key. As such knowledge is often difficult to remember—particularly if the association is not often performed as is normally the case, especially in home networks—then the user may be tempted to leave security holes in the system. Such security holes may appear if the user writes the information down, chooses a very simple network key, or simply leaves the key delivered with the device, which may mean that the network key is '0' and thus offers practically no protection whatsoever.

The present invention attempts to remedy at least some of the concerns connected with the prior art, while enabling a user to create a secure community of devices that may be equipped with simple user interfaces and where at least some of the devices may not be physically attainable.

SUMMARY OF THE INVENTION

In a first aspect, the invention is directed to a method of inserting a first device into a community of at least one device having knowledge of a user's login and password verifier. The first device receives from the user's login and password, searches for reachable devices, asks at least one reachable device if it knows the user's login, and receives at least one response. In case the response is positive, the first device performs Secure Remote Password (SRP) authentication with the device that responded, the SRP authentication proving to the device that responded that the first device knows the user's password and proving to the first device that the device that responded knows the user's password verifier. If the authentication is successful, the first device calculates and stores the user's password verifier; and receives and stores a secret community key.

In a preferred embodiment, the first device further establishes a secure channel with the device that responded comprising, between the step of performing SRP authentication and the step of calculating and storing the user's password verifier.

In a further preferred embodiment, the first device performs SRP authentication in turn with each device that provided a positive response until at least one SRP authentication is successful.

In another preferred embodiment, the asking step comprises sending a message that comprises a secure salt hash of the user's login.

In yet another preferred embodiment, the asking step is performed by broadcasting a message.

In a second aspect, the invention is directed to a first device adapted to be inserted into a community of at least one device having knowledge of a user's login and password verifier. The first device comprises a user interface adapted to receive the user's login and password; a communication unit adapted to search for reachable devices, ask at least one reachable device if it knows the user's login, and receive at least one response. The first device further comprises a processor adapted to: in case the received response is positive, perform, via the communication unit Secure Remote Password (SRP) authentication with the device that responded, the SRP authentication proving to the device that responded that the first device knows the user's password and proving to the first device that the device that responded knows the user's password verifier; and calculate and store the user's password verifier. The communication unit is further adapted to receive from the device that responded a secret community key.

In a preferred embodiment, the processor is further adapted to calculate a secure salt hash of the user's login and the communication unit is adapted to use the secure salt hash to ask the at least one reachable device if it knows the user's login.

In a further preferred embodiment, the processor is further adapted to repeat SRP authentication for each device that provided a positive response until at least one SRP authentication is successful.

BRIEF DESCRIPTION OF THE DRAWINGS

The various features and advantages of the present invention and its preferred embodiments will now be described

DETAILED DESCRIPTION OF PREFERRED EMBODIMENTS

Figure 1:
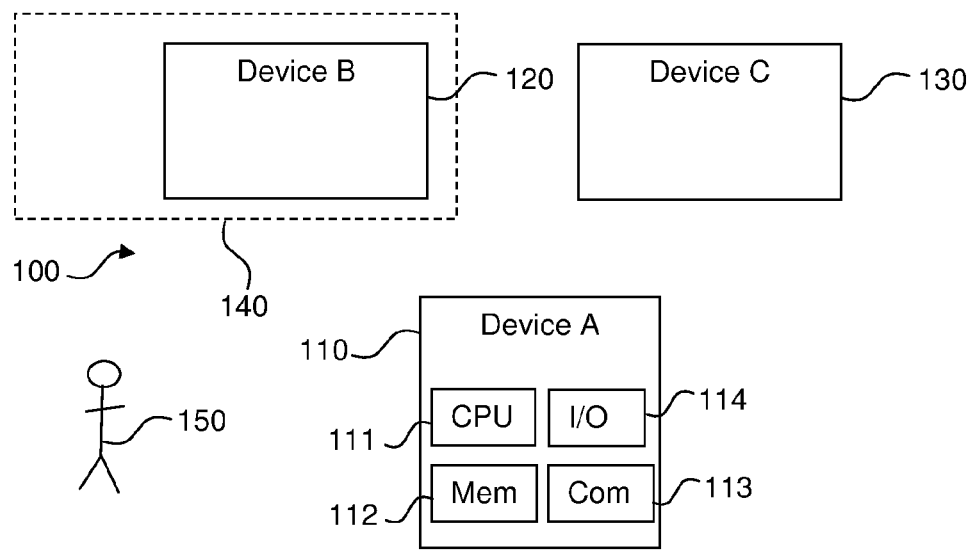
FIG. 1 illustrates an exemplary environment in which the invention is used.

FIG. 1 illustrates an exemplary environment 100 in which the invention may be used. The environment 100 comprises three devices: device A 110, device B 120 and device C 130. Although illustrated only for device A 110 for the sake of clarity, each device preferably comprises a processor 111 for calculation, verification, and for controlling the devices, a memory 112 for storing data, a communication unit 113 for interaction with other devices, and a user interface 114. The communication unit 113 preferably uses radio technology for communication, but other means of communication, such as for example infrared light or wire-bound communication, may also be used.

For the sake of illustration, it is assumed that device B 120 is a member of a community 140 (indicated by the dashed lines), while device C 130 is not. Furthermore, still for the sake of illustration, it is assumed that device C 130 has no knowledge of the user 150. In the example hereinafter, the user 150 wishes to insert device A 110 into the community 140.

Figure 2:
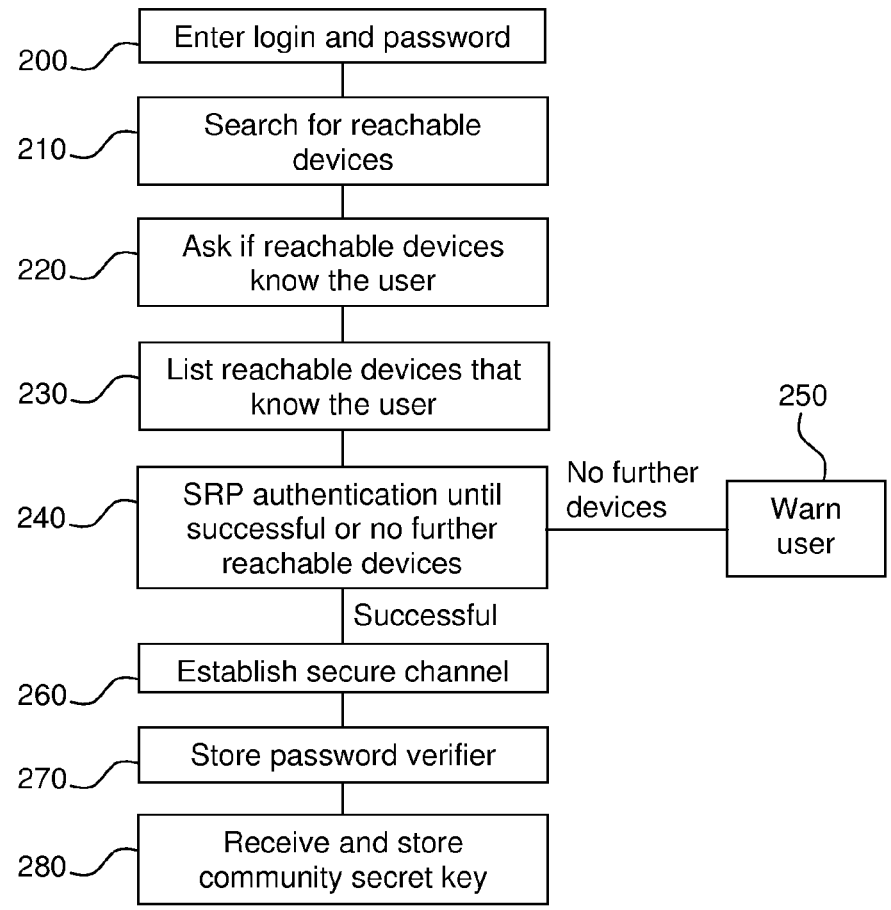
FIG. 2 illustrates a flow chart of the general idea of the invention.

FIG. 2 illustrates a flow chart of the general idea of the invention. The user 150 uses an application running on the processor 111 of device A 110 to enter 200 his login and password through the user interface 114. Device A 110 searches 210 for reachable devices using any standard technique, such as for example the one used by Universal Plug and Play (UPnP), and stores a list of the reachable devices in its memory 112. As both device B 120 and device C 130 are reachable in the example, the list comprises these two devices.

Device A 110 then asks 220 each device on the list, i.e. device B 120 and device C 130, if they know the user 150, more precisely if they know the login associated with the user 150. The login is sent as a salt secure hash is used, as this keeps the login safe. A salt secure hash of the login is obtained by modifying the login with a random number (known as salt), for example by appending the former to the latter, and then hashing the modified login; the hashed modified login is then sent together with the salt to device B and device C.

The device A 110 sends a challenge to the device B 120. When device B 120 receives such a challenge, it calculates a response to this challenge and sends it to device A 110. Then, device A 110 checks the response to check if the authentication is successful or not. At the end of the secure mutual authentication part, the device A 110 has verified that the device B 120 knows the password verifier and the device B 120 has verified that the device A 110 knows the password verifier. No exchanged data permits to retrieve any kind of information about the password even if the device B is an attacker.

In a preferred embodiment, SRP—defined in RFC2945—is used. Device A Device B 120 and device C 130 verify if they have the login stored and if they do they send a response to device A; in this case, only device B 120 knows the user 150 and consequently only device B sends a response. Device A 110 stores 230 a list of the devices that know the user, i.e. device B 120. Device A 110 then attempts 240 to perform secure mutual authentication, preferably based on Secure Remote Password (SRP), with each device on possesses the password and a hash x of the password. Device B possesses the password verifier, $v=g^x(\mod m)$; m is a large safe prime (2q+1, q is a prime), g is a primitive root mod m. Device A generates a random number a and calculates $A=g^a(\mod m)$ that it sends to device B. Device B then generated random numbers b, u and calculates $B=v+g^b(\mod m)$ that is sent together with u to device A. Device A then calculates $K=(B-g^x)^{a+ux}(\mod m)$ and device B calculates $K=(Av^u)^b(\mod m)$. Each device may then prove to the other that it knows K and each device may then verify that the other device indeed knows K.

One way to mutually prove knowledge of K is for device A to send to device B a hash M of the salted login, A, B, and K; while device B may respond with a hash of A, M, and K.

If device A 110 does not succeed in authenticating a single device on the list, then the insertion into the community has failed and device A 110 warns 250 the user 150.

However, if device A 110 succeeds in authenticating a device, in the example device B 120, then device A 110 and device B 120 establish 260 a secure channel, using the secret key provided by the SRP secure mutual authentication.

Device A 110 then calculates and stores 270 the password verifier for the user 150. The password verifier is information that allows the verification of the user's password, preferably a salt secure hash.

Device B 120 then provides 280 device A 110 with the secret key of the community 140, which is stored in the memory 112. At this point, device A 110 knows the user's password verifier and the community secret key, and belongs to the community 140.

It can thus be appreciated that the present invention improves upon the prior art by providing a secure way to associate devices using only login and password.

The above specification, examples and drawings provide a complete description of the manufacture and use of the composition of the invention. Since many embodiments of the invention can be made without departing from the spirit and scope of the invention, the invention resides in the claims herein after appended.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of inserting a first device into a community of at least one device having knowledge of a user's login and password verifier, the method comprising at the first device steps of:
   receiving the user's login and password;
   searching for reachable devices;
   asking each reachable device if it knows the user's login;
   receiving from at least one responding device a response indicating that the responding device knows the user's login;
   performing Secure Remote Password (SRP) authentication with each responding device that knows the user's login, the SRP authentication proving the first device's knowledge of the user's password to the responding device and proving the responding device's knowledge of the user's password verifier to the first device; wherein the SRP authentication is repeated for each responding device until at least one SRP authentication is successful; and, when a responding device is successfully authenticated:
calculating and storing the user's password verifier; and
receiving from the responding device that is successfully authenticated a secret community key and storing the secret community key.

2. The method of claim 1, further comprising, between the step of performing SRP authentication and the step of calculating and storing the user's password verifier, the step of establishing a secure channel with the responding device.

3. The method of claim 1, wherein the asking step comprises sending a message that comprises a secure salt hash of the user's login.

4. The method of claim 1, wherein the asking step is performed by broadcasting a message.

5. A first device adapted to be inserted into a community of at least one device having knowledge of a user's login and password verifier, the first device comprising:
a user interface adapted to receive the user's login and password;
a communication unit adapted to:
search for reachable devices;
ask each reachable device if it knows the user's login; and
receive from at least one responding device a response indicating that the responding device knows the user's login; and,
a processor adapted to:
perform, via the communication unit Secure Remote Password (SRP) authentication with each responding device, the SRP authentication proving the first device's knowledge of the user's password to the responding device and proving the responding device's knowledge of the user's password verifier to the first device; wherein the processor is adapted to repeat the SRP authentication for each responding device until at least one SRP authentication is successful, and when a responding device is successfully authenticated,
calculate and store the user's password verifier; and
wherein the communication unit is further adapted to receive from the responding device a secret community key.

6. The first device of claim 5, wherein the processor is further adapted to calculate a secure salt hash of the user's login and the communication unit is adapted to use the secure salt hash to ask the at least one reachable device if it knows the user's login.

* * * * *